US006870876B1

(12) United States Patent
Nohlgren et al.

(10) Patent No.: US 6,870,876 B1
(45) Date of Patent: Mar. 22, 2005

(54) METHOD FOR SENDING INFORMATION IN A TELECOMMUNICATION SYSTEM

(75) Inventors: Anders Nohlgren, Luleå (SE); Jim Sundqvist, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 776 days.

(21) Appl. No.: 09/612,132

(22) Filed: Jul. 7, 2000

(30) Foreign Application Priority Data

Jul. 8, 1999 (SE) .......................................... 9902630-4

(51) Int. Cl.[7] .............................. H04B 1/38; H04L 5/16
(52) U.S. Cl. ..................................... 375/220; 375/355
(58) Field of Search ................................ 375/220, 354, 375/357–576; 348/484; 379/24; 364/724.1; 370/477; 710/53

(56) References Cited

U.S. PATENT DOCUMENTS

| 4,564,918 | A | * | 1/1986 | McNally et al. ............... 702/79 |
| 5,790,893 | A | * | 8/1998 | Polge et al. .................... 710/53 |
| 5,929,921 | A | * | 7/1999 | Taniguchi et al. .......... 348/484 |
| 6,084,916 | A | * | 7/2000 | Ott ............................... 375/259 |
| 6,226,356 | B1 | * | 5/2001 | Brown .......................... 379/24 |

FOREIGN PATENT DOCUMENTS

| EP | 680033 A3 | 11/1995 |
| EP | 814581 A2 | 12/1997 |
| EP | 892515 A1 | 1/1999 |
| JP | 8256084 | 10/1996 |
| JP | 10145345 | 5/1998 |
| WO | WO96/28946 | 9/1996 |

OTHER PUBLICATIONS

Conway, Andrian E. et al., "Synchronized Two–Way Voice Simulation Tool for Internet Phone Performance Analysis and Evaluation", XP–000770880, pp. 108–122.
Ramachandran, Ramjee et al., "Adaptive Playout Mechanism for Packetized Audio Applications in Wide–Area Network", pp. 680–688, Jun. 12, 1994.
Lau, Richard, "Synchronious Frequency Encoding Technique for B–ISDN Circuit Emulation", XP–000606387, pp. 160–171, SPIE vol. 1179 Fiber Networking and Telecommunications.
JP 10145345, English Abstract.
JP 8256084, English Abstract.

\* cited by examiner

Primary Examiner—Stephen Chin
Assistant Examiner—Curtis Odom

(57) ABSTRACT

The invention is concerned with a method and an apparatus, wherein information data is sent between at least two transceivers in a telecommunication system. The information data is transmitted from the sender of a transceiver to the receiver of one or more other transceivers in form of digital signals having a given sampling frequency. The signals are played out by the receiver in a controlled way. The invention is mainly characterized by estimation of the sender's sampling rate at the sending side of a transceiver, transmitting the estimation to the receiving side of an another transceiver, and controlling the playout of the information data at the receiving side by means of the sampling rate estimated at the sending side to avoid delays and/or interrupts in the presentation. The invention is especially suitable in connection with packet based networks wherein the information data is sent between the transceivers in the telecommunication system in form of packet data frames, such as audio frames.

22 Claims, 2 Drawing Sheets

METHOD FOR SENDING INFORMATION IN A TELECOMMUNICATION SYSTEM

This application claims priority under 35 U.S.C. §§119 and/or 365 to 9902630-4 filed in Sweden on July 8, 1999; the entire content of which is hereby incorporated by reference.

The invention is concerned with a method for sending information between at least two transceivers in a telecommunication system. The method of the invention is suitable for transporting messages over packet based networks.

DESCRIPTION OF BACKGROUND ART

The interest for transporting speech over packet based networks has grown the last few years. It has become to be known as IP-telephony. Most packed based systems of today are based on the Internet protocol (IP), and its sub protocols, the Transmission Control Protocol (TCP) and the User Datagram Protocol (UDP). TCP guarantees reliable transmission of data and allows some sort of flow control. A typical application using the TCP protocol is the File Transfer Protocol (FTP). During a file transfer, it is very important that the data gets to the receiving host and therefore one has to make sure that the packets arrives and are sorted into correct order. UDP does not provide any guarantees about the connection, but is used when a guaranteed connection requires too much control signaling.

Real-time applications, as for example IP-telephony, use UDP. For these applications, retransmission of lost packets makes no sense since resent packets will be too late to be used in the synthesis at the receiving side anyhow. IP-telephony uses the Real Time Protocol (RTP) together with IP/UDP protocols. The RTP header contains information about sequence number, the packet's time etc. RTP is e.g. used to synchronize audio and video streams. Another essential part of the transmission of real-time streams is the Real Time Control Protocol (RTCP). It is used for the control of RTP. RTCP conveys information about the session participants, and periodically distributes control packets containing quality information to all session participants.

One problem, which occurs in IP-telephony, is underrun or overrun in the playout buffer. The playout buffer is a buffer where the speech samples are stored before they are played out by the D/A converter. If there is underrun, the playout buffer will get into starvation, i.e. there will no longer be any samples to play on the output. Overrun occurs when the playout buffer is filled with samples. Consequently, samples will be lost.

The reason for these problems is the lack of synchronization between the sampling rates (i.e. sampling frequencies) at the sending and receiving side. Namely, in the communication between transceivers in the telecommunication system, the messages are sent in form of digital signals from the sender of a transceiver to the receiver of another transceiver. The signals transmitted from the sender have a first sampling frequency. The receiver buffers these signal in a playout buffer with this sampling frequency but plays them out with a second sampling frequency. When the first frequency, with which the signals are buffered in the playout buffer, is higher than the second frequency, which is the playout frequency, there is a risk for the play-out buffer to be filled with samples and there will be no room for subsequent samples, i.e. overrun. When the first frequency is lower then the second one, the play-out buffer might come into a situation without samples, i.e. underrun.

In cellular systems, the sampling frequency of all terminals connected to the network are controlled by an accurate timing reference provided by the system. With this accurate timing reference and PLLs (Phase locked loops) controlling the sampling frequency, underrun or overrun situations will never occur. By PLL technique, e.g. the sampling rate can be controlled. If the buffer is growing it plays out faster, where after the buffer return to its default value. The sampling rate is all the time corrected depending on the size of the buffer.

To compensate for the difference in sampling rates between the sending and the receiving sides, time stretching could be used to give a stimulus the same duration at the receiving side as the duration the same stimuli had on the sending side. How much to stretch the signals depends on the difference in sampling frequency between the sending side and the receiving side(s). Time stretching means that a stimulus of N-samples is replaced with one with M samples. By doing this time stretching in an appropriate way, overrun or underrun will never occur.

There are different ways to do this time stretching. In EP patent application 0680033, a solution to stretch a speech signal in time is presented. It takes a speech stimulus with a first duration and changes this speech stimulus to a second duration. A solution to find the conversion factor between said first and second durations is not given.

Another solution to stretch a signal in time is presented in "Applications of Digital Signal Processing to Audio and Acoustics" (p. 291) by Mark Kahrs and Karlheinz Brandenburg, published by "Kluwer Academic Publishers", 1998, London. This method is not signal dependent, but it takes an arbitrary signal consisting of N samples and replaces it with another signal consisting of M samples. This solution to do time stretching does not give the conversion factor either.

Currently, most manufacturers of IP-telephony equipment do not take into account the fact that the sampling frequency difference between the sending and receiving side might differ. Therefore, no solutions are available.

Another field of interest for IP-telephony is accurate measurements of the end-to-end delay between two terminals. To be able to get accurate results of the end-to-end measurements, there is a need to compensate for the clock skew, i.e. the difference in clock frequency between the sending and the reciving side. In an article by Moon S., Skelly P., Towsley D, "Estimation and Removal of Clock Skew from Network Delay Measurements", Technical report 98-43, Department of Computer Science, University of Massachusetts at Amherst, October 1998, there is presented different methods to estimate the difference in clock frequency between the computer at sending and receiving. The estimation is performed at the receiving end, and the methods all use the time stamps from RTP and measurements of the arriving time of the packets.

Another approach to extract the difference in clock frequency, close to the above mentioned method, is protected by the Nippon Telegraph & Telephone Corporation in the Japanese Patent Application JP-10145345. By sending information about the transmitting time together with the data (or speech) to the receiver and using measurements of the receiving time at the receiver, the frequency ratio between the two terminals can be calculated.

The solutions proposed in the above mentioned methods yields a satisfactory estimate of the clock skew, but not fast enough. The method described in JP-10145345 assumes that the estimation of the frequency ratio takes place during the call. However, the estimation process is slow and an overrun/underrun situation might already have occured during this time, with audible artifacts as a consequence.

The object of the invention is therefore a method and arrangement that provides for faster estimation of the clock skew to avoid delays and/or interrupts in the transmission from sender to receiver.

SUMMARY OF THE INVENTION

In the method of the invention, information data is sent between at least two transceivers in a telecommunication system. The information data is transmitted from the sender of a transceiver to the receiver of one or more other transceivers in form of digital signals having a given sampling frequency. The signals are played out by the receiver in a controlled way. The method is mainly characterized by estimation of the sender's sampling rate at the sending side of a transceiver, transmitting the estimation to the receiving side of an another transceiver, and controlling the playout of the information data at the receiving side by means of the sampling rate estimated at the sending side to avoid delays and/or interrupts in the presentation.

The invention is especially suitable in connection with packet based networks wherein the information data is sent between the transceivers in the telecommunication system in form of packet data frames, such as audio frames. Usually the transceivers comprise both a sender and a receiver, but the invention, of course, also covers such cases, wherein the information data is sent from a transceiver which only works as a sender and wherein the information data is received by a transceiver which only works as a receiver. The communication is usually an interactive communication, but the invention can also be applied for example in situations, in one way communications and in communications with several transceivers.

When it is question about a two-way communication there are different embodiments with respect to the transmitting of the estimations and how they are used in the communication.

In one embodiment, when a two-way communication is performed between at least two transceivers, the method is performed so that an estimation of the sender's sampling frequency is performed at the sending side of a first transceiver, said estimation is transmitted to the receiving side of a second transceiver, the play-out of the received data is controlled at said receiving side of said second transceiver by means of the sampling rate estimated at said sending side of said first transceiver, an estimation of the sampling frequency of the sending side of said second transceiver is performed at said sending side of said second transceiver, the estimation of the sampling frequency of said sending side of said second transceiver is transmitted to the receiving side of said first transceiver, and the play-out of the received data is controlled at said receiving side of said first transceiver by means of the sampling rate estimated at said sending side of said second transceiver.

In another embodiment, the communication between atlst two transceivers can be performed so that an estimation of the sender's sampling-frequency is performed at the sending side of a first transceiver, the estimation is transmitted to the receiving side of a second transceiver, the play-out of the received data is controlled at said receiving side of said second transceiver by means of the sampling rate estimated at said sending side of said first transceiver, the estimation of the sampling rate estimated at said sending side of the first transceiver is used in the transmitting of messages from the second transceiver to the first transceiver in the communication between said transceivers.

In the preferred embodiment of the invention, the controlling of the play-out of received data at said receiving side by means of the sampling rate estimated at said sending side is carried out by estimation of the receiver's sampling frequency at said receiving side and performing a compensation of the difference in said estimated sampling frequencies at said sending and receiving sides by a sample rate conversion method. Said conversion method can be a method known in the art, e.g. a method, wherein the amount of samples in the packet frames are changed. The method can for example be the one referred to earlier on page 2, i.e. the one presented in "Applications of Digital Signal Processing to Audio and Acoustics" (p.291) by Mark Kahrs and Karlheinz Brandenburg.

In another embodiment of the invention, the controlling of the play-out of received data at said receiving side by means of the sampling rate estimated at said sending side is carried out by synchronizing the receiver's sampling rate at said receiving side to the sender's sampling rate. This method usually requires a stable reference frequency. The synchronization can be carried out by some known method in the art, for example by means of the earlier mentioned PPL-method used for cellular systems.

Said transmitting ore estimation can be done during a call-set up, which is the more preferable alternative or alternatively, during the session. Said estimation is incorporated in regular reports, in which case the estimation can be incorporated in the reports sent with the RTCP protocol and/or transmitted as separate reports in own packets.

These methods are meant to be used for sampling frequency estimation to improve the compensation for overrun/underrun in the playout buffer.

In the invention, each terminal can continuously estimate its own sampling frequency, $\tilde{F}_s$. When a call is initiated, or whenever needed, this estimation is transmitted to the other terminal/terminals. The correct sampling frequency is now available at the receiving side already at call setup and it can immediately be used to control the playout buffer, i.e. there is no initial delay until the estimate is available.

The estimation of the sampling rate is carried out in form of a calculation based on the time measured between two events and the number of samples that has been sampled between them. These events are advantageously two time synchronization events. A time synchronization event can be such an event, wherein a host clock in the transceiver is e.g. synchronized to an external clock. The time can also be measured between two frame delivers of packet data, e.g. audio frames.

A ticking Central Processing Unit (CPU) clock can be used to measure the time value between two events by calculating the number of ticks between the events. The nominal number of ticks per second is given through a system constant, depending on the nominal crystal frequency, which is the frequency set on the computer processor.

The true number of ticks per second is estimated by means of a long term stable time reference and the computer clock. The long term stable time reference can be a synchronized host clock. The true number of ticks per second can be estimated as a function of the time between two computer clock values and the time difference between two reference time values. In one embodiment, the number of ticks per second is calculated as a moving average of the last few estimations.

When the status of the input buffer (and optionally also the output buffer) is polled before an estimation, continuously or in connection with specific events, the frequency estimation is advantageously carried out directly by means of the time difference between the time values at two synchronization events and the time difference between two reference time values at the same events. The estimation can also be carried out by means of a moving average of the last few estimations.

The estimation process of the invention is preferably performed continuously so that the best possible estimate would be available all the time.

The arrangement of the invention comprising at least two transceivers in a telecommunication system is, mainly characterized by means for estimation of the sender's sampling frequency at the sending side of a transceiver, means for transmitting the estimation to the receiving side of another transceiver, and means for controlling the play-out of the received data at the receiving side by means of the sampling rate estimated at said sending side to avoid delays and/or interrupts in the presentation (the playout at the receiving side).

In a preferable embodiment, said means for controlling the play-out of the received data at said receiving side comprises means for estimation of the receiver's sampling frequency and means for performing a compensation of the difference in said estimated sampling frequencies at the sending and receiving sides by means of a sample rate conversion method.

The means for estimation of the sampling rate at the sending side preferably comprises a Calculation Unit (CCU) for calculation the CPU ticks per seconds, and a Sampling Frequency Estimation Unit (SEU).

The means for transmitting the estimation to the receiving side comprises a Sampling Frequency Distribution Unit (SDU), which is the interface between the transfer protocols and said estimation units (CCU, SEU).

The invention can be used to continuously estimate the sampling frequency in a terminal and transmitting this information to the receiving terminals, so that better buffer management algorithms can be deployed. Consequently, better audio quality is achieved. In addition, the estimation of true number of CPU ticks per second in the host can be distributed to other applications. Those then have access to a more accurate timing information provided through the estimated CPU ticks per second.

The invention is especially useful in real-time applications with a periodicity, typically audio and video. These applications take a speech frame or a picture with given intervals. The delay in sending has to be kept low since they are interactive applications.

In the following, the invention is described in detailed by means of some preferred embodiments and some figures which are not meant to restrict the invention, the scope of which are defined by the claims. The invention is for example applicable to packet mode transmitting generally, even if there in the embodiments is referred to audio frames, which is an example of a suitable application. Also the word "comprising" has to be understood so that it does not exclude other possible components or features.

DETAILED DESCRIPTION

The following terminology is used to describe the invention in detail. In a terminal hosted in a computer, there are several different clocks available:

The sample clock, $t^s$, is a clock, which is generated on the soundboard, if sound is sent, and it is separated from the computers own clock. The sound board is a signal receiving entity that takes samples on given time intervals. The sample clock works on discrete increasing integer time values and each step corresponds to a sample interval, $T_s$. The sample interval is the inverse of the sampling frequency, $F_s$.

The central processing unit (CPU) clock, $t^c$, is the computer's own clock. It works on discrete, increasing integer values. One step is often called "a tick" and in this application the CPU clock is said to be a "ticking" clock. An application can use the CPU clock to measure the time between two events. By reading the value of $t^c$ at two different times it can calculate the number of ticks between them. The actual time between these two events can then be calculated if the number of ticks per second is known. In a computer, this is provided through a system constant, $\tilde{T}_c$, which is calculated from the nominal crystal frequency in the processor. However, the true number of ticks per second, $T_c$, is not available as the true number depends on e.g. the manufacturing and the conditions in which the processor is used.

The host clock, $t^h$, gives the time in year, month, day, hour, minutes, seconds and microseconds. It is usually controlled by the CPU clock, but it can be synchronized to an external clock. The synchronization can be done through the Network Time protocol (NTP). NTP is used in a computer network to allow the computers in the network to synchronize their clocks to Universal time Coordinated time (UTC time). The UTC time, the same as Greenwich Mean Time (GMT), is a time scale based on atomic clocks, and therefore it has a good stability and accuracy. Another example of an external source for synchronization is the Global Positioning System (GPS). A GPS receiver can be installed and in a workstation to synchronize $t^h$ to the stable time scale provided in GPS.

If the host time is not adjusted the deviation from true time will increase with the time. When the host clock is adjusted, the deviation will be less compared to the deviation of an unadjusted clock when measuring any time. However, the optimal time to perform the measurements is directly after the host clock has been adjusted to the external time reference.

The "true" clock, $t^t$, is the time provided by NTP or GPS.

Figure 1:
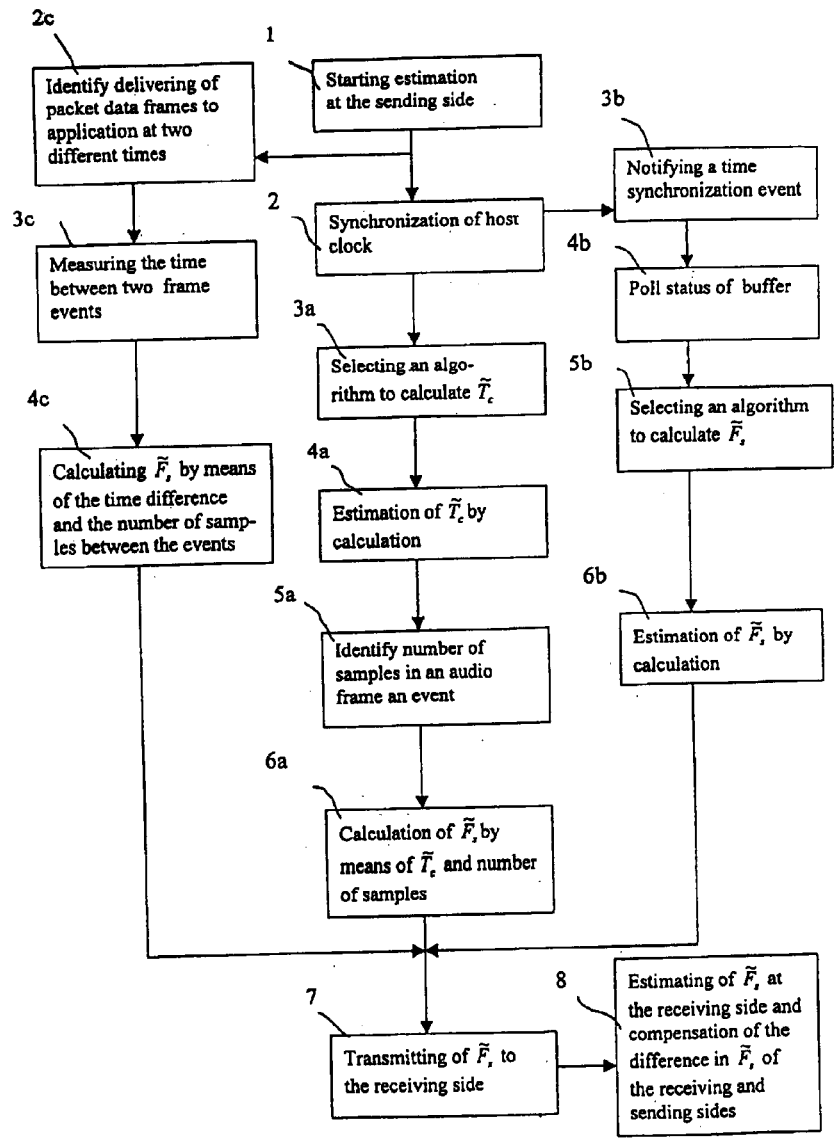
FIG. 1 is a flow scheme of some preferred embodiments of the method of the invention.

FIG. 1 is a flow scheme of some preferred embodiments a, b, and c of the invention.

1) The steps of the first embodiment of the invention are indicated with letter "a" in FIG. 1.

The estimation process starts at the sending side of a transceiver in a telecommunication system as indicated in step 1 of FIG. 1. Step 1 is common for all of the three illustrated embodiments of the invention.

The sampling frequency can be estimated in different ways, for example depending on if there is a possibility to poll the buffer status to find out how many samples there are available to be brought up to the application. In the first and second embodiments of the invention it is assumed that, there is no possibility to determine the status of the buffer. In these first and second embodiments, the events, when the buffer deliver packet frames to the application, are used in the estimation of the sampling frequency. When for example audio frames are delivered to the application, they usually have a fixed block size, for instance the number of samples needed as input to a speech coding unit.

An accurate and fast way in accordance with the invention to estimate the sample frequency at the sender side, e.g. the sampling frequency of the soundboard, is to make use of three unsynchronized series of events. The first event is the above mentioned CPU tick counter that is continuously increasing with time. The second event is the updating of the host clock by the external time reference indicated in step 2 of FIG. 1. The third series of events is the receiving of the data packets, for example when the soundboard delivers audio frames to the application.

To get the best possible estimation of the sample frequency at the receiver, the following steps are carried out in the first embodiment of the invention:

When data is received, the number of CPU ticks since the last data packet delivery is estimated. The best possible estimate of the number of CPU ticks per second, $\tilde{T}_c$, is achieved by doing the estimation at the time instances when the host clock is synchronized to the external time reference as indicated in step 2 of FIG. 1. The estimation of the number of CPU ticks per second, $\tilde{T}_c$, can also be estimated during a very long period as a background job in a terminal. E.g. the counting of the number of CPU ticks per second can begin already when the terminal is booted up (not illustrated).

Thus, $\tilde{T}_c$ can be estimated as a function of $t_0^h$ which is the time of the host clock $t^h$ when the estimation process started, (step 1 of FIG. 1), for example the time the computer is turned on, $t_n^h$, which is the time of the host clock $t^h$ when it was synchronized to an external clock, as indicated in step 2 of FIG. 1 (step 2 is common for two of the illustrated embodiments of the invention), for example the n:th NTP or GPS upgrade at time point n, $t_0^c$, which is the time of the CPU clock when the estimation process started, as indicated in step 1 of FIG. 1, and $t_n^c$, which is the time of the CPU, when the host clock was synchronized to an external clock, as indicated in step 2 of FIG. 1 as above.

Different algorithms can be used to calculate $\tilde{T}_c$ as indicated in step 3 of FIG. 1. The algorithm can generally be expressed as $$\tilde{T}_c = f(t^c_m, t^c_n, t^t_m, t^t_n)$$

$t^c_m$=the time of the CPU clock at time point m
$t^c_n$=the time of the CPU clock at time point n
$t^t_m$=the time of the true clock at time point m
$t^t_n$=the time of the true clock at time point n.

Since $t^h$ is synchronized to $t^t$, $t^t$ can be used in the equation instead of $t^h$.

Then an estimation of the CPU ticks per seconds, 4, is calculated, as indicated in step 4a of FIG. 1. The function might be $$f(t^c_m, t^c_n, t^t_m, t^t_n) = (t^c_n - t^c_0)/(t^t_n - t^t_0)$$

wherein $t^c_m$, $t^c_n$, $t^t_m$, $t^t_n$, $t^c_0$ and $t^0_t$ are defined as above. The subscript defines the time point and the superscript tells refers to the clock.

Other functions might also be considered. For instance $\tilde{T}_c$ can be calculated as a moving average of the last few estimations according to the equation $$\tilde{T}_c = \sum_n k(n) \tilde{T}_{cn}$$

where
k(n) is the weight of the n:th estimation (Different measurements are advantageously weighted differently depending on when the measurement was carried out. Usually the latest measurements are weighted more. The sum of the weights shall be 1), $$\tilde{T}_{cn} = \frac{t^c_n - t^c_{n-1}}{t^t_n - t^t_{n-1}}$$

where time point n−1 is the time point at the event preceding an event at time point n and thus $t_n^c - t_{n-1}^c$ is the difference in computer clock values at these time points and $t_n^t - t_{n-1}^t$ is the time difference in the synchronized host clock values (true time values) at the same time points.

Only an updating of $\tilde{T}_c$ at an event when the external time reference adjusts the host clock will ensure that the most accurate time is used for the estimate. If an arbitrary time is used, the estimate of $\tilde{T}_c$ will not have the same accuracy. Preferably, the estimation process is executed continuously when the computer is turned on. By the time the call is initiated an accurate estimate of $\tilde{T}_c$ will be available.

In step 5a, the number of samples in a packet data is noted. When it for example is question about audio frames, the number is known, as the packets are of a fixed length. If the packet size varies, the number can be figured out by reading data of how many samples each packet contains and by taking these values into consideration, which gives one more variable. With the estimated value of $\tilde{T}_c$ and the number of samples in one frame, the sampling frequency is achieved as indicated in step 6a by means of e.g. the following function.

$$\tilde{F}_s = \frac{N(n-m)}{(\tau^c_n - \tau^c_m)/\tilde{T}_c}$$

where m≠n and N is the frame size.
m and n are discrete time points.

Here $\tau^c_n$ is the value of the CPU clock at the delivery of the n:th packet and correspondingly $\tau^c_m$ for the delivery of the m:th packet.

The estimated sampling frequency is transmitted in step 7, for example by using RTCP protocol, to this receiving side of another transceiver, whereby the packet to be transmitted to the receiver might be of the Application-defined RTCP (APP) packet type. In the packet type, there is a field for application-dependent data which can contain the estimated sampling frequency, but in this case, the reports must be extended with a profile-specific extensions according to Schulzrinne, H., et Al., "RTP: A transport Protocol for Real-Time Applications", RFC 1889, IETF, January 1996.

In step 8, the sampling frequency is estimated at the receiver with the same methods and a compensation of the difference in said estimated sampling frequencies at said sending and receiving sides is carried out by a sample rate conversion method. Said conversion method can be a method known in the art, e.g. a method, wherein the amount of samples in the packet frames are changed. The method can for example be the one referred to earlier on page 2, i.e. the one presented in "Applications of Digital Signal Processing to Audio and Acoustics" (p.291) by Mark Kahrs and Karlheinz Brandenburg.

2) The steps of the second embodiment of the invention 4s indicated with letter "c" in FIG. 1.

In the second embodiment, the estimation can be done without making use of the time synchronization events.

Also in the second embodiment of the invention, the sampling frequency is estimated by means of the time between two different frame events as polling of the buffer status is not carried out or cannot be done depending on the construction of the operative system and the soundboard. However, if the time between host synchronization events is larger than the measurement time, the inaccuracy in the estimate will be as large as the unsynchronized host clock.

In step 2c, delivering of data, e.g. audio frames to the application, is identified. The time between two frame events is then measured in step 3c, where after the sampling frequency, $\tilde{F}_s$, can be estimated by calculation as indicated in step 4c, for example from the equation $$\tilde{F}_s = \frac{N(n-m)}{t_n^h - t_m^h}$$

where
$t_n^h - t_m^h$ is the difference between the arriving times (host clock times) of two data frames at time point n resp.m,
N is the amount of samples in a frame,
n is the frame number at time point n, and
m is the frame number at time point m.

The method then proceeds as in steps 7 and 8 of the first embodiment described above.

3) The third embodiment of the invention requires the possibility to poll the audio buffert status. This embodiment is indicated with letter "b" in FIG. 1.

As soon as there is a time synchronization event as indicated in step 2, the most accurate time for the host clock, $t^h$ will be available. Since $t^h$ is synchronized to $t^t$, $t^t$ can be used in the equation instead of $t^h$. At these events, the status of the buffer is polled in step 4b and the sampling frequency can be calculated based on the time between the synchronization events and the number of samples that has been sampled between them. Different algorithms can be used to calculate $\tilde{F}_s$ as is indicated in step 5b and a suitable algorithm can be expressed as $$\tilde{F}_s = f(t^s_m, t^s_n, t^t_m, t^t_n)$$

where the function, with which $\tilde{F}_s$ is estimated in step 6b might be $$f(t^s_m, t^s_n, t^t_m, t^t_n) = (t^s_n - t^s_0)/(t^t_n - t^t_0)$$

wherein
$t^s_n$ is the time of the sample clock at time point n,
$t^s_0$ is the time of the sample clock at time point 0, for example when the estimation started,
$t^t_n$ is the time of the host clock at a synchronization event at time point n (the "true" clock),
$t^t_0$ is the time of the host clock at a synchronization event at time point 0 (the "true" clock).

Other functions might also be considered. For instance $\tilde{F}_s$ can be calculated as a moving average of the last few estimations according to the equation $$\tilde{F}_s = \sum_n k(n) \tilde{F}_{sn}$$

where $$\tilde{F}_{sn} = \frac{t^s_n - t^s_{n-1}}{t^t_n - t^t_{n-1}}$$

wherein
the time values are defined as above, the superscript s meaning the sample clock, the superscript t meaning the true clock, and the subscripts indicating different time points explained earlier
and k(n) is the weight of the n:th estimation.

To get the best estimation, the calculation should be done at a host clock synchronization.

The method then proceeds as in steps 8 and 9 of the first embodiment described above.

4) In a fourth embodiment of the invention (not illustrated) there is still one possibility to estimate the sampling frequency, $\tilde{F}_s$, which is carried out without synchronization of the host clock to an external source.

Together with the estimated $\tilde{T}_c$, the clock skew between the true clock and the host clock can also be calculated. By calculating the frequency difference between these clocks, this information can be used to adjust the read host time based on the time since the last host clock correction. If the frequency difference between the true clock and the host clock is calculated by means of the adjusted host time, the sampling frequency can be calculated. With the information about the clock skew, the time, measured with the host clock between frame n and m, can be compensated to yield true time. As in the case of estimating $\tilde{T}_c$, this process needs to be performed continuously to get the best estimation.

An example of an algorithm to calculate the sampling frequency is $$\tilde{F}_s = \frac{N}{k(t_n^h - t_m^h)}$$

where
N is the amount of samples
k is the correction factor between real-time and host clock time and the time difference is defined as above.

Figure 2:
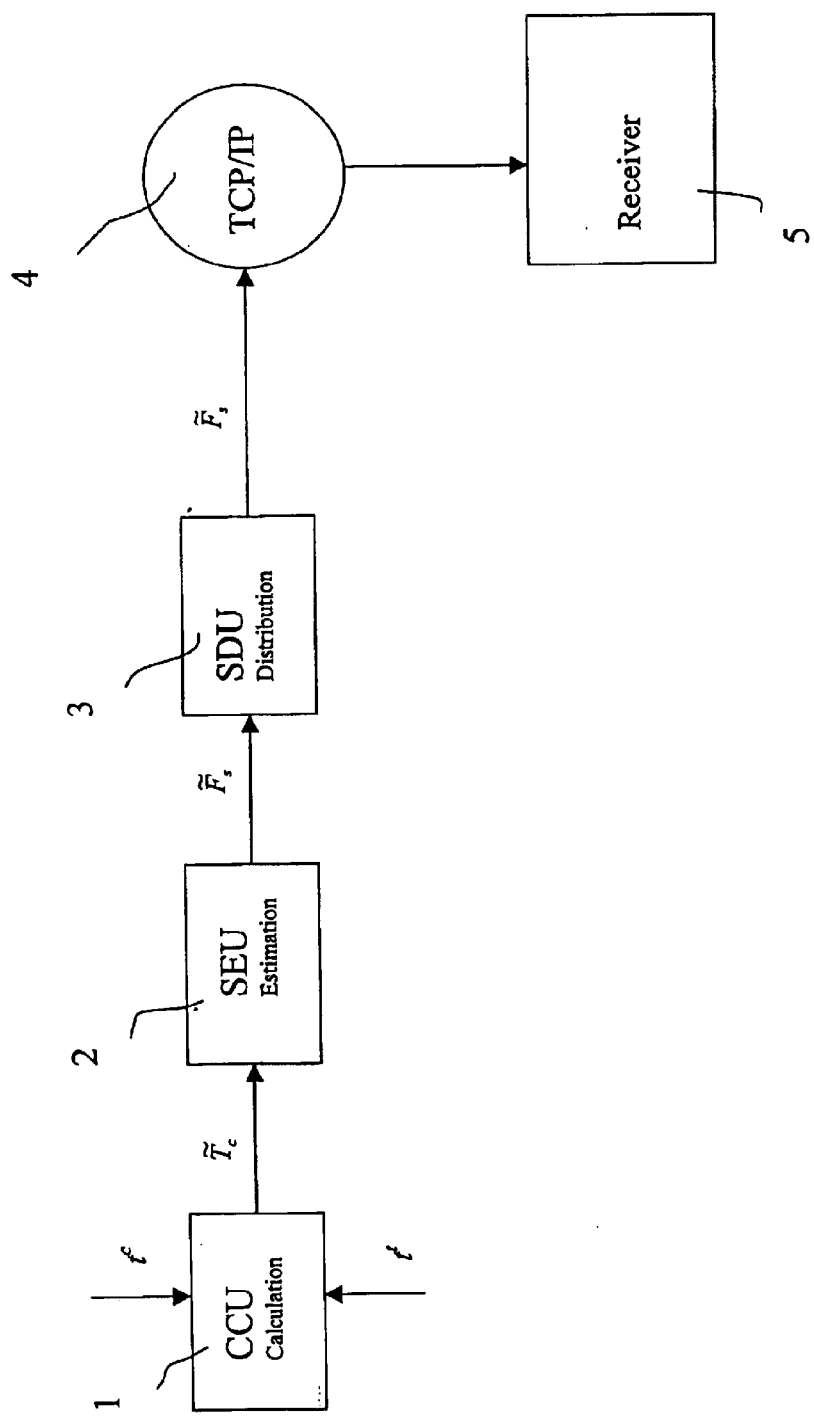
FIG. 2 is a schematic view of the arrangement of the invention.

FIG. 2 presents an arrangement of the invention to carry out the claimed method.

The arrangement comprises a CPU ticks Calculating Unit (CCU). The calculation unit has the reference number 1 in FIG. 2. The calculation unit 1 uses a stable time reference, supplied through an external source, e.g. NTP or GPS, to calculate an estimate of the number of CPU ticks per second, $\tilde{T}_c$.

The inputs to the Calculation Unit (CCU) is a long term stable time reference and $t^c$, which is the value of the CPU clock as described above. The time reference can for example be the value of a synchronized host clock, $t^h$, as described above. If NTP or GPS is used to synchronize $t^h$ to $t^t$, the time base provided by the host clock will have a good long term accuracy. The output from the CCU is $\tilde{T}_c$.

The estimated $\tilde{T}_c$ is forwarded to a Sampling Frequency Estimation Unit (SEU), which estimates the soundboard's sampling frequency (=sampling rate), $\tilde{F}_s$. The SEU might use other values than the $\tilde{T}_c$ to estimate the sampling frequency as was described above in connection with FIG. 1. The Sampling Frequency Estimation Unit has the reference number 2 in FIG. 2.

The estimate of the, sampling frequency is forwarded to the Sampling Frequency Distribution unit (SDU) indicated with reference number 3 in FIG. 2. The Sampling Frequency Distribution Unit 3 is the interface between the transfer protocols 4 and the Estimation Unit 2. It supplies the terminal's own sampling frequency to the appropriate protocols, which for example can be TCP/IP protocols, and receives the sampling frequency from other terminals (not illustrated) for further distribution to the receiver 5.

What is claimed is:
1. A method for sending information data between at least two transceivers in a telecommunication system, wherein the information data is transmitted from a sending side of a transceiver to a receiving side of one or more other transceivers in the form of digital signals having a given sampling rate, which signals are played out at said receiving side in a controlled way, comprising the following steps:

a) estimation of a sender's sampling rate at said sending side, b) transmitting the estimation to said receiving side, and c) controlling the play-out of received data at said receiving side by means of the sampling rate estimated at said sending side to avoid delays in the presentation, wherein the controlling of the play-out of received data at said receiving side by means of the sampling rate estimated at said sending side is carried out by estimation of a receiver's sampling rate at said receiving side and performing a compensation of the difference in said estimated sampling rates at said sending and receiving sides by a sample rate conversion method, wherein the estimation of the sampling rate in step a) is carried out in the form of a calculation based on a time measured between two events and a number of samples that has been sampled between them and wherein a ticking central processing unit (CPU) clock is used to measure the time between two events by:

reading a time value of the CPU clock at two different times;

estimating a number of ticks between the time values; and calculating an actual time between the events by means of the number of ticks per time unit.

2. The method of claim 1, characterized in that the information data is sent in the form of packet data frames.

3. The method of claim 2, characterized in that the packet data frames are audio frames.

4. The method of claim 1, characterized in that in said conversion method an amount of samples in the packet frames are changed.

5. The method of claim 1, characterized in that in step c), the controlling of the play-out of received data at said receiving side by means of the sampling rate estimated at said sending side is carried out by synchronizing the receiver's sampling rate to the sender's sampling rate.

6. The method of claim 5, characterized in that the synchronization is carried out by means of a phase locked loop (PLL).

7. The method of claim 1, characterized in that the method is performed in a two-way communication between at least two transceivers in such a way that an estimation of the sender's sampling rate is performed at the sending side of a first transceiver, the estimation is transmitted to the receiving side of a second transceiver, the playing out of the received data is controlled at said receiving side of said second transceiver by means of the sampling rate estimated at said sending side of said first transceiver, the estimation of the sampling rate estimated at said sending side of the first transceiver is used by said second transceiver in the transmitting of messages from the second transceiver to the first transceiver in the communication between said transceivers.

8. The method of claim 1, characterized in that it is performed in a two-way communication between at least two transceivers in such a way that an estimation of the sender's sampling rate is performed at the sending side of a first transceiver, the estimation is transmitted to the receiving side of a second transceiver, the playing out of the received data is controlled at said receiving side of said second transceiver by means of the sampling rate estimated at said sending side of said first transceiver, an estimation of the sampling rate of the sending side of said second transceiver is performed at said sending side of said second transceiver, the estimation of the sampling rate of said sending side of said second transceiver is transmitted to the receiving side of said first transceiver, and the play-out of the received data is controlled at said receiving side of said first transceiver by means of the sampling rate estimated at said sending side of said second transceiver.

9. The method of claim 1, characterized in that the transmitting in step b) is done at call setup so that received data can immediately be used at the receiving side to avoid initial delays in the compensation before the presentation.

10. The method of claim 1, characterized in that the estimation is either or both incorporated in regular reports within standard control packets or transmitted as separate reports within individual packets.

11. The method of claim 1, characterized in that the time is measured between two time synchronization events.

12. The method of claim 11 characterized in that in the time synchronization event, a host clock is synchronized to an external clock.

13. The method of claim 1, characterized in that the time is measured between two frame delivers of packet data.

14. The method of claim 1, characterized in that the number of ticks per second is estimated by means of a long term stable time reference and the CPU clock.

15. The method of claim 14, characterized in that the long term stable time reference is a synchronized host clock.

16. The method of claim 1, characterized in that the number of ticks per second is calculated as a function of a time difference between two CPU clock values at specific events and a time difference between two reference time values at the same events.

17. The method of claim 1, characterized in that the number of ticks per second is calculated as a moving average of a last few estimations.

18. The method of claim 1, characterized in that the estimation in step a) is carried out at a time synchronization event.

19. The method of claim 1, characterized in that the status of a soundboard buffer is polled before estimation, continuously or in connection with specific events.

20. The method of claim 19, characterized in that the estimation is carried out by means of a time difference between time values at two synchronization events and the time difference between two reference time values at the same events.

21. The method of claim 1, characterized in that the estimation in step a) is carried out by means of a moving average of a last few estimations.

22. The method of claim 1, characterized in that the estimation process is performed continuously.

* * * * *

UNITED STATES PATENT AND TRADEMARK OFFICE
CERTIFICATE OF CORRECTION

PATENT NO. : 6,870,876 B1 Page 1 of 1
APPLICATION NO. : 09/612132
DATED : March 22, 2005
INVENTOR(S) : Nohlgren et al.

It is certified that error appears in the above-identified patent and that said Letters Patent is hereby corrected as shown below:

In Column 3, Line 56, delete "atlst" and insert -- at least --, therefor.

In Column 4, Line 25, delete "ore" and insert -- of the --, therefor.

In Column 4, Line 61, after "time" insert -- difference --, therefor.

In Column 6, Line 35, after "and" insert -- utilized --, therefor.

In Column 7, Line 59, delete "toethe" and insert -- to the --, therefor.

In Column 8, Line 63, delete "4s" and insert -- is --, therefor.

In Column 9, Line 25, delete "possfbility" and insert -- possibility --, therefor.

Signed and Sealed this

Thirtieth Day of October, 2007

JON W. DUDAS
*Director of the United States Patent and Trademark Office*